United States Patent
Niizuma

(10) Patent No.: US 9,669,844 B2
(45) Date of Patent: Jun. 6, 2017

(54) VEHICLE TRANSFER DEVICE, AND VEHICLE WHICH SUPPLIES POWER TO TRANSFER DEVICE

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 553 days.

(21) Appl. No.: 14/256,520

(22) Filed: Apr. 18, 2014

(65) Prior Publication Data
US 2014/0225434 A1    Aug. 14, 2014

Related U.S. Application Data

(63) Continuation of application No. PCT/JP2012/083682, filed on Dec. 26, 2012.

(30) Foreign Application Priority Data

Dec. 27, 2011   (JP) .................................. 2011-285200

(51) Int. Cl.
  *B66F 7/24*   (2006.01)
  *B66F 7/28*   (2006.01)
  (Continued)

(52) U.S. Cl.
  CPC .............. *B61C 9/38* (2013.01); *B60L 11/182* (2013.01); *B60L 11/1803* (2013.01);
  (Continued)

(58) Field of Classification Search
  CPC ..... B66F 7/24; B66F 7/28; E04H 6/06; E04H 6/12; E04H 6/18; E04H 6/22; E04H 6/24;
  (Continued)

(56) References Cited

U.S. PATENT DOCUMENTS 3,876,085 A * 4/1975 Bright ...................... E04H 6/24
  414/231
4,029,218 A * 6/1977 Matsuura .................. E04H 6/06
  414/240
(Continued)

FOREIGN PATENT DOCUMENTS

CN       102160254 A      8/2011
JP       02-130961       10/1990
(Continued)

OTHER PUBLICATIONS

Japanese Office Action dated Jun. 23, 2015 issued in Japanese Application No. 2011-285200 with an English language translation.
(Continued)

*Primary Examiner* — Levi Gannon
(74) *Attorney, Agent, or Firm* — Ostrolenk Faber LLP

(57) ABSTRACT

A transfer device transfers an electric vehicle, that has been loaded onto a pallet, in a left-right direction or in an up-down direction relative to the direction of forward travel of the electric vehicle. The pallet is provided with: a power-receiving coil that, together with a power-supplying coil of the electric vehicle, forms an electromagnetic coupling circuit; a power-receiving circuit that receives power that is supplied wirelessly from the outside via the electromagnetic coupling circuit; and an electric motor that is driven by power received by the power-receiving circuit, and that causes the pallet to move in the left-right direction or in the up-down direction.

7 Claims, 10 Drawing Sheets

(51) Int. Cl.

| | |
|---|---|
| *E04H 6/06* | (2006.01) |
| *E04H 6/18* | (2006.01) |
| *E04H 6/22* | (2006.01) |
| *E04H 6/34* | (2006.01) |
| *H02J 17/00* | (2006.01) |
| *B61C 9/38* | (2006.01) |
| *H02J 50/10* | (2016.01) |
| *E04H 6/36* | (2006.01) |
| *B60L 11/18* | (2006.01) |
| *E04H 6/24* | (2006.01) |
| *E04H 6/42* | (2006.01) |
| *H02J 7/02* | (2016.01) |
| *B60L 15/00* | (2006.01) |

(52) U.S. Cl.
CPC ....... *B60L 11/1814* (2013.01); *B60L 11/1824* (2013.01); *B60L 11/1833* (2013.01); *B60L 11/1846* (2013.01); *B60L 15/007* (2013.01); *B66F 7/24* (2013.01); *B66F 7/28* (2013.01); *E04H 6/06* (2013.01); *E04H 6/18* (2013.01); *E04H 6/22* (2013.01); *E04H 6/24* (2013.01); *E04H 6/34* (2013.01); *E04H 6/36* (2013.01); *E04H 6/422* (2013.01); *H02J 7/025* (2013.01); *H02J 17/00* (2013.01); *H02J 50/10* (2016.02); *B60L 2210/10* (2013.01); *B60L 2210/30* (2013.01); *B60L 2210/40* (2013.01); *B60L 2220/12* (2013.01); *B60L 2220/14* (2013.01); *B60L 2220/54* (2013.01); *B60L 2220/56* (2013.01); *Y02T 10/641* (2013.01); *Y02T 10/645* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ... E04H 6/34; E04H 6/36; E04H 6/422; H02J 17/00; H02J 50/10; H02J 50/12
USPC .......................... 307/9.1, 10.1, 104
See application file for complete search history.

(56) References Cited

U.S. PATENT DOCUMENTS

| | | | |
|---|---|---|---|
| 5,637,973 A | 6/1997 | Hirai et al. | 318/640 |
| 5,770,936 A | 6/1998 | Hirai et al. | 318/538 |
| 5,798,622 A | 8/1998 | Hirai et al. | 318/16 |
| 5,818,188 A | 10/1998 | Hirai et al. | 318/480 |
| 5,821,731 A | 10/1998 | Kuki et al. | 320/108 |
| 5,850,135 A | 12/1998 | Kuki et al. | 320/108 |
| 2005/0207876 A1* | 9/2005 | Springwater | E04H 6/24 414/231 |
| 2010/0213770 A1* | 8/2010 | Kikuchi | H01Q 1/248 307/104 |

FOREIGN PATENT DOCUMENTS

| | | |
|---|---|---|
| JP | 05-239947 | 9/1993 |
| JP | 05-256038 | 10/1993 |
| JP | 07-139205 | 5/1995 |
| JP | 08-019985 | 1/1996 |
| JP | 9-149502 | 6/1997 |
| JP | 9-215211 | 8/1997 |
| JP | 2000-289587 | 10/2000 |
| JP | 2001-008380 | 1/2001 |
| JP | 2001-030979 | 2/2001 |
| JP | 2002-194916 | 7/2002 |
| JP | 2006-288034 | 10/2006 |
| JP | 2007-126835 | 5/2007 |
| JP | 2008-236916 | 10/2008 |
| JP | 2009-005469 | 1/2009 |
| JP | 2009-225551 | 10/2009 |
| JP | 2011-97814 | 5/2011 |
| JP | 2011-234496 | 11/2011 |
| WO | WO 2011/112795 A1 | 9/2011 |

OTHER PUBLICATIONS

International Search Report and Written Opinion mailed Jan. 29, 2013 in corresponding PCT International Application No. PCT/JP2012/083682.

Chinese Office Action, dated Aug. 12, 2015, issued in corresponding Chinese Patent Application No. 201280064208.9. English translation. Total 16 pages.

European Search Report, dated Oct. 7, 2015, issued in corresponding European Patent Application No. 12862471.5. Total 7 pages.

Rafal M. Miskiewicz, et al. "Contactless Battery Charger With Bi-Directional Energy Transfer for Plug-In Vehicles With Vehicle-to-Grid Capability" *Industrial Electronics (ISIE)*, IEEE International Symposium on IEEE (Jun. 27, 2011), pp. 1969-1973. XP032019341.

* cited by examiner

VEHICLE TRANSFER DEVICE, AND VEHICLE WHICH SUPPLIES POWER TO TRANSFER DEVICE

This application is a continuation application based on a PCT Patent Application No. PCT/JP2012/083682, filed Dec. 26, 2012, whose priority is claimed on Japanese Patent Application No. 2011-285200, filed Dec. 27, 2011. The contents of both the PCT application and the Japanese Patent Application are incorporated herein by reference.

TECHNICAL FIELD

The present invention relates to a transfer device that transfers a vehicle in a left-right direction or in an up-down direction, and to a vehicle that is suitable for this device.

BACKGROUND ART

In recent years, in order to attain the ideal of a low-carbon society, vehicles that are able to move via the power of an electric motor have become common. These vehicles are provided with a storage battery (for example, a secondary battery such as a lithium-ion battery or a nickel-hydrogen battery or the like) that is able to be recharged, and drive the motor using power from the storage battery. The vehicles are able to move as a result of the wheels being rotated by the power from the motor. Typical examples of this type of vehicle include electric vehicles (EV) and hybrid vehicles (HV). Electrically-driven carrier vehicles and electric wheelchairs and the like are examples of vehicles other than automobiles.

In these vehicles, movement in a front-rear direction (i.e., in a forward travel direction) is easy, however, it is difficult for the vehicle to move by itself in a left-right direction (i.e., in a left-right direction that is orthogonal to the direction of forward travel: i.e., in a sideways direction) or in an up-down direction. Because of this, in cases when it is necessary to move a vehicle in a left-right direction or in an up-down direction such as, for example, when the vehicle is being parked in the narrow space or when goods are being loaded or unloaded from the vehicle, it is common for the vehicle to be transferred using a movable pallet that is capable of being moved in a left-right direction or in an up-down direction. In Patent documents 1 through 4 (see below), technology for transferring a vehicle in a left-right direction or in an up-down direction using this type of movable pallet is disclosed.

DOCUMENT RELATED ART

Patent Documents

[Patent document 1] Japanese Unexamined Patent Application (JP-A) No. 2001-30979
[Patent document 2] Japanese Unexamined Patent Application (JP-A) No. H5-239947
[Patent document 3] Japanese Unexamined Patent Application (JP-A) No. H5-256038
[Patent document 4] Japanese Examined Utility Model (Registration) Application Publication No. H2-130961

SUMMARY OF INVENTION

Technical Problem

However, the majority of the aforementioned movable pallets are driven by power from an electric motor, or are driven hydraulically using an electric motor as a power source. Because of this, in the location where the movable pallet is installed, it is necessary for a cable that is connected to a power source to be laid as far as the location where the electric motor is installed. Moreover, if the electric motor that is used to drive the pallet is built into the pallet, then as is disclosed, for example, in the aforementioned Patent document 3, it is necessary for this cable to be movable so that it does not obstruct the movement of the pallet and so that the cable does not become damaged when the pallet is moved.

Laying out of a cable causes not only an increase in the number of man-hours required, but also costs to increase. Because of this, if the parking area is only a temporary construction, or if the facilities for loading and unloading a vehicle are for a construction site having a limited working life and are therefore only temporary, then the increase in the man-hours and costs required to lay a cable are particularly problematic. Moreover, as is disclosed in the aforementioned Patent document 3, if the cable is a movable cable then such cables are easily damaged, and the problem arises that a huge amount of care is needed in order for such a cable to be kept in good condition.

The present invention was conceived in view of the above-described circumstances, and it is an object thereof to provide a transfer device that does not require a cable for supplying power to be installed, that is low in cost, and that is easy to maintain, and to also provide a vehicle that is suitable for this transfer device.

Solution to Problem

In order to achieve the above-described objects, a transfer device according to a first aspect of the present invention is a transfer device (1, 3) that transfers a vehicle (2), that has been loaded onto a pallet (30), in a left-right direction or in an up-down direction relative to the direction of forward travel of the vehicle, wherein the pallet is provided with: a power-receiving coil (31) that, together with an external power-supplying coil (43), forms an electromagnetic coupling circuit; a power-receiving circuit (32) that receives power that is supplied wirelessly from the outside via the electromagnetic coupling circuit; and an electric motor (34) that is driven by power received by the power-receiving circuit, and that causes the pallet to move in the left-right direction or in the up-down direction.

Moreover, in the transfer device according to a second aspect of the present invention, in the above-described first aspect the pallet is provided with: a power converting device (35) that converts a portion of the power received by the power-receiving circuit; and a control unit (37) that operates by means of the power converted by the power converting device, and controls operations of the electric motor.

Moreover, in the transfer device according to a third aspect of the present invention is characterized in that, in the above-described second aspect, the pallet is provided with a command input portion (36) that operates by means of the power converted by the power converting device, and receives inputs of transfer commands from the outside that indicate that the vehicle is to be moved in the left-right direction or in the up-down direction, and the control unit controls the electric motor based on the transfer commands input into the command input portion.

Moreover, in the transfer device according to a fourth aspect of the present invention, in the above-described first aspect the external power-supplying coil is provided in the vehicle, and the power-receiving coil is mounted in such a position that, when the vehicle has been loaded onto the pallet, the power-receiving coil is able to face the external power-supplying coil that is provided in the vehicle.

Moreover, a vehicle according to a fifth aspect of the present invention is a vehicle (2) that is provided with a motor that generates power for movement, and a storage battery (41) that supplies power to drive the motor, and that also is provided with: a power-supplying coil (43) that, when it is installed in the pallet provided in the transfer device according to the above-described first aspect, forms an electromagnetic coupling circuit together with the power-receiving coil provided in the pallet; and a power converter (42 or 45) that converts DC power stored in the storage battery into AC power, and then supplies this to the power-supplying coil.

Moreover, in the transfer device according to a sixth aspect of the present invention, in the above-described fifth aspect there is provided a command output portion (44) that outputs to the outside a transfer command that indicates that the vehicle which has been loaded onto the pallet is to be transferred in the left-right direction or in the up-down direction.

Moreover, in the transfer device according to a seventh aspect of the present invention, in the above-described fifth or sixth aspects there is provided a power supply destination setting means (46, 47, 50, and 51) that sets a supply destination for AC power output from the power converter (45) either to the power-supplying coil or to the motor.

Effects of the Invention

According to the present invention, a power-receiving coil and a power-receiving circuit that are used to wirelessly receive power that is supplied from the outside, and an electric motor that is driven by the power received by the power-receiving circuit are provided in a pallet, and the electric motor is driven using the power supplied wirelessly from the outside so that the pallet is able to move in a left-right direction and in an up-down direction. Because of this, the effects are obtained that it is not necessary to lay a cable that might be used to supply power to the electric motor, and not only are the costs of the installation kept low, but the installation is easy to maintain. Moreover, because power can be supplied to the pallet wirelessly, the effect is obtained that it is possible to supply power stably without any contact malfunctions or short-circuiting or the like occurring.

DESCRIPTION OF EMBODIMENTS

Hereinafter, a transfer device and a vehicle according to embodiments of the present invention will be described in detail with reference to the drawings. Note that, hereinafter, an example is described in which the vehicle is an electric vehicle that uses only an electric motor as a motive power generation source.

First Embodiment

Figure 1A:
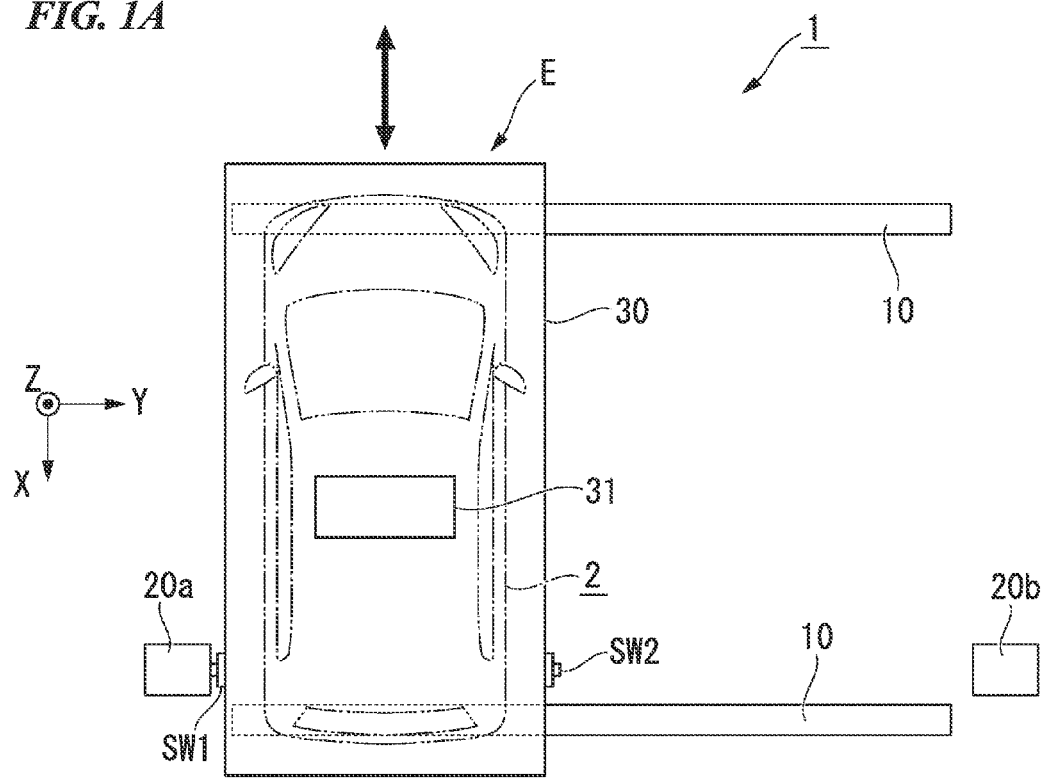
FIG. 1A is a view showing in simplified form the mechanical structure of a transfer device according to a first embodiment of the present invention.
Figure 1B:
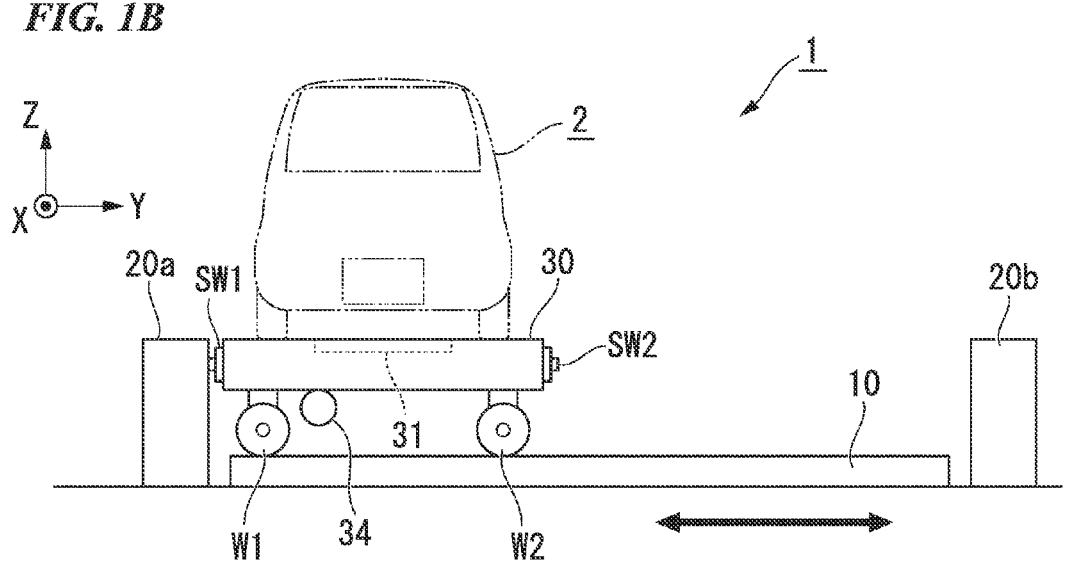
FIG. 1B is a view showing in simplified form the mechanical structure of the transfer device according to the first embodiment of the present invention.

FIG. 1A is a top view showing in simplified form the mechanical structure of a transfer device according to a first embodiment of the present invention, while FIG. 1B is a rear view of the same. As is shown in FIG. 1A and FIG. 1B, a transfer device 1 of the present embodiment is provided with rails 10, stoppers 20a and 20b, and with a pallet 30. While the transfer device 1 is receiving a supply of power from a vehicle in the form of an electric vehicle 2 that has entered via an entry/exit position E and has been parked on top of the pallet 30, it causes the electric vehicle 2 to be moved (i.e., transferred) along the rails 10. Note that in the present embodiment, the transfer device 1 is installed in a parking lot.

Note also that, in the following description, the positional relationship between each component is described while referring, when necessary, to an XYZ orthogonal coordinate system that has been set in the drawings. However, in order to facilitate the description, the point of origin of the XYZ orthogonal coordinate system shown in each drawing is not fixed, and the position thereof is suitably altered in each drawing. In the XYZ orthogonal coordinate system shown in FIGS. 1A and 1B, the X-axis is along the direction of entry/exit of the electric vehicle 2 relative to the transfer device 1 (i.e., the front-rear direction, the direction of forward travel), the Y-axis is along the transfer direction of the electric vehicle 2 (i.e., a left-right direction that is perpendicular to the direction of forward travel), and the Z-axis is along the vertical direction. Note that hereinafter, for reasons of convenience, a −Y direction is referred to as the 'left direction' or 'left side', while a +Y direction is referred to as the 'right direction' or 'right side'.

The rails 10 support the weight of the pallet 30 (when the electric vehicle 2 has been loaded thereon, they also support the weight of the electric vehicle 2 in addition to that of the pallet 30), and at the same time enable the pallet 30 to be moved in the Y direction. These rails 10 have a length that is substantially the same as the length of the range of allowable movement (i.e., the movable range) of the pallet 30, and are laid in parallel with each other in the Y direction, while being set at a distance from each other that is narrower than the length in the X direction of the pallet 30.

The stopper 20a is a prismatic component that is provided on the left-end side of a rail 10, and is provided in order to prevent the pallet 30 moving further to the left side than its movable range. The stopper 20b is a prismatic component that is provided on the right-end side of the same rail 10, and is provided in order to prevent the pallet 30 moving further to the right side than its movable range.

The pallet 30 has sufficient mechanical strength to support the weight of the electric vehicle 2, and is a rectangular plate-shaped component when seen in top view that is constructed such that it is able to move in the Y direction when the electric vehicle 2 has been mounted on its top surface. A power-receiving coil 31 that is used to receive power that is supplied wirelessly from the electric vehicle 2 is provided in a center portion of the top surface of the pallet 30. Here, if a metal is present around the periphery of the power-receiving coil 31, then there is a possibility that the wireless power supply efficiency will deteriorate as a result of the electromagnetic field being affected by this metal. Because of this, it is desirable that portions that are peripheral to the location where the power-receiving coil 31 is provided on the pallet 30 are formed using a material other than metal (for example, plastic or FRP (fiber reinforced plastic)), or that these portions are instead hollowed out.

Moreover, an electric motor 34 as well as drive wheels W1 and idle wheels W2 are provided on an underside portion of the pallet 30. The electric motor 34 is driven by power that is received by the power-receiving coil 31, and causes the drive wheels W1 to rotate via a reduction gear (not shown). By switching the rotation direction of the electric motor 34 (i.e., between a normal rotation and a reverse rotation), it is possible to switch the rotation direction of the drive wheels W1 (i.e., to switch the direction of movement of the pallet 30). Note that a three-phase induction motor or a permanent magnet synchronous motor or the like can be used for the electric motor 34.

The drive wheels W1 are wheels that are driven by the electric motor 34 so as to move the pallet 30 in the Y direction at the same time as it is supporting the weight of the pallet 30 and the electric vehicle 2, and two of the drive wheels W1 are provided so as to correspond to the two rails 10. The idle wheels W2 are wheels that are provided in order to support the weight of the pallet 30 and the electric vehicle 2, and two of the idle wheels W2 are provided so as to correspond to the two rails 10. Note that it is also possible to provide drive wheels W1 instead of the idle wheels W2 so that all four of the wheels are drive wheels W1.

Limit switches SW1 and SW2 are provided respectively at a right end portion and a left end portion of the pallet 30. The limit switch SW1 is a switch that is used to detect whether or not the pallet 30 has reached the left end portion of its movable range, while the limit switch SW2 is a switch that is used to detect whether or not the pallet 30 has reached the right end portion of its movable range. When the pallet 30 reaches the left end portion of its movable range, the limit switch SW1 comes into contact with the stopper 20a and is turned on, while when the pallet 30 reaches the right end portion of its movable range, the limit switch SW2 comes into contact with the stopper 20b and is turned on.

Figure 2:
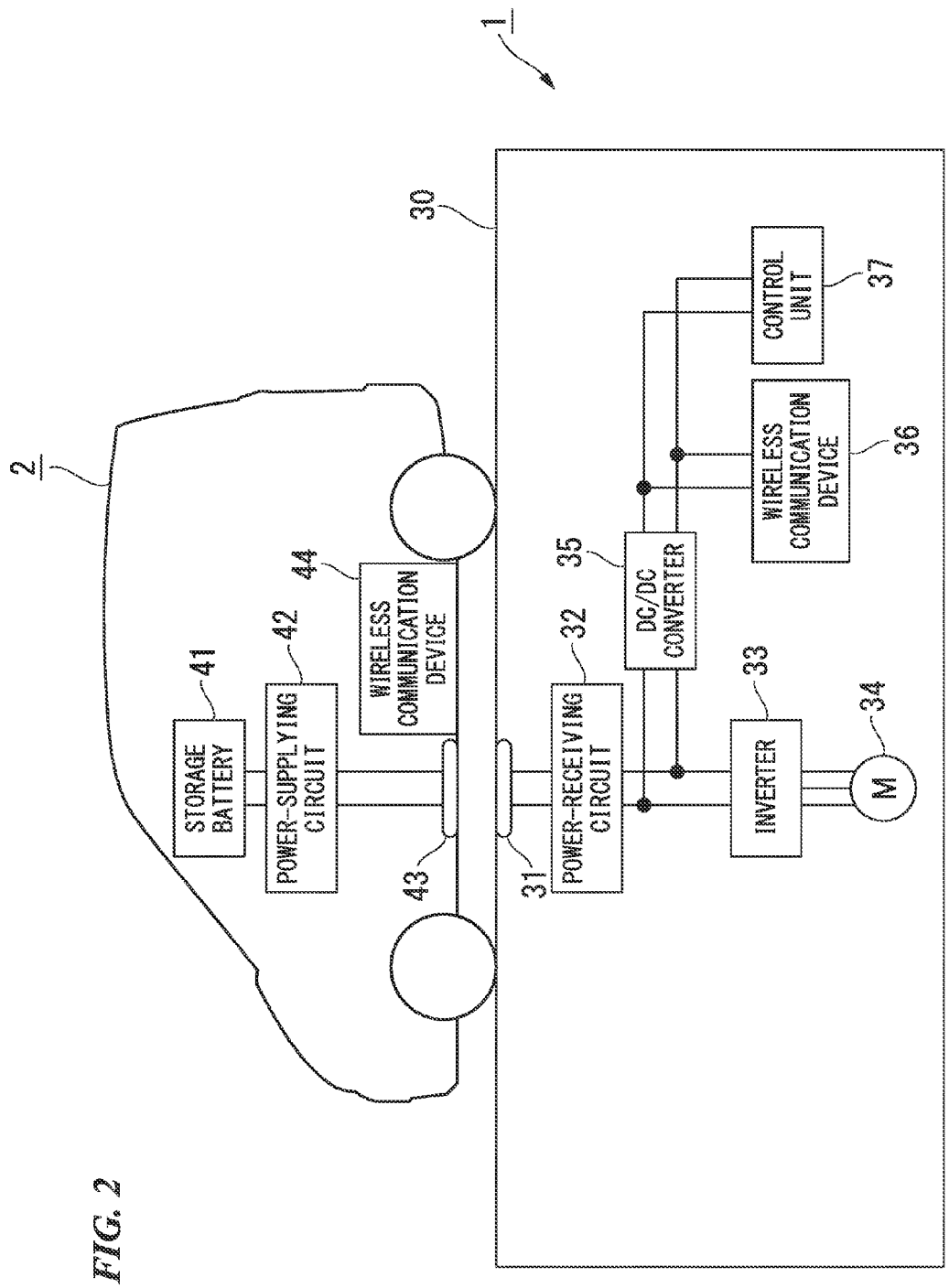
FIG. 2 is a block diagram showing the electrical structure of the transfer device and vehicle according to the first embodiment of the present invention.

FIG. 2 is a block diagram showing the electrical structure of the transfer device and the vehicle according to the first embodiment of the present invention. Note that in FIG. 2, only the pallet 30 portion of the transfer device 1 is shown. As is shown in FIG. 2, the power-receiving coil 31, a power-receiving circuit 32, an inverter 33, the electric motor 34, a DC/DC converter 35 (i.e., a power converter), a wireless communication device 36 (i.e., a command input portion), and a control unit 37 are provided in the pallet 30 that is provided on the transfer device 1.

As is described above, the power-receiving coil 31 is provided in a central portion of the top surface of the pallet 50, and is a coil that is used to wirelessly receive power (i.e., AC power) that is supplied from a power-supplying coil 43 that is provided in the electric vehicle 2. Specifically, the power-receiving coil 31 is mounted in a position where it is opposite, or is almost opposite the power-supplying coil 43 of the electric vehicle 2 when the electric vehicle 2 has been loaded onto the pallet 30. An electromagnetic coupling circuit is formed as a result of the power-supplying coil 43 of the electric vehicle 2 being positioned adjacent to the power-receiving coil 31 and opposite or almost opposite (hereinafter, both of these states will be referred to simply as 'opposite') the power-receiving coil 31. Note that when the power-supplying coil 43 and the power-receiving coil 31 are opposite each other, they are either parallel with each other or substantially parallel with each other.

The aforementioned electromagnetic coupling circuit refers to a circuit in which power is supplied wirelessly from the power-supplying coil 43 to the power-receiving coil 31 as a result of the power-supplying coil 43 and the power-receiving coil 31 being electromagnetically coupled together, and may be either a circuit that supplies power by means of electromagnetic induction or a circuit that supplies power by means of magnetic field resonance. Note that when the electromagnetic coupling circuit that is formed by the power-supplying coil 43 and the power-receiving coil 31 is a circuit that supplies power by means of magnetic field resonance, then it is still possible for power to be supplied extremely efficiently even if the power-receiving coil 31 is not opposite the power-supplying coil 43. Because of this, in cases when it is difficult for the power-supplying coil 43 to be placed opposite the power-receiving coil 31, then it is desirable for an electromagnetic coupling circuit that supplies power by means of magnetic field resonance to be formed.

The power-receiving circuit 32 receives power (i.e., AC power) that is supplied wirelessly via the electromagnetic coupling circuit that is formed by the power-supplying coil 43 of the electric vehicle 2 and the power-receiving coil 31, and converts this received power into DC power. The inverter 33 drives the electric motor 34 under the control of the control unit 37 using the DC power that has been converted by the power-receiving circuit 32. As is described above, the electric motor 34 is a motor that causes the drive wheel W1 to be rotated via a reduction gear (not shown), and generates motive power corresponding to the driving of the inverter 33.

The DC/DC converter 35 converts a portion of the DC power converted by the power-receiving circuit 32 into DC power. Specifically, it converts the voltage of a portion of the DC power converted by the power-receiving circuit 32 into a voltage that is suitable for the wireless communication device 36 and the control unit 37 to operate. The wireless communication device 36 is operated by means of the DC voltage converted by the DC/DC converter 35, and is capable of wirelessly communicating various types of information with a wireless communication device 44 that is provided in the electric vehicle 2. This wireless communication device 36 receives, for example, transfer command information (i.e., information showing a command to transfer the electric vehicle 2 that has been loaded onto the pallet 30 in the Y direction (i.e., in the transfer direction)) that has been transmitted from the wireless communication device 44 provided in the electric vehicle 2.

The control unit 37 is powered by means of DC power converted by the DC/DC converter 35, and controls the operations of the transfer device 1. Specifically, when the aforementioned transfer command information is received by the wireless communication device 36, the control unit 37 controls the operations of the electric motor 34 by controlling the inverter 33. While it is performing this control, the control unit 37 is constantly monitoring whether or not the limit switches SW1 and SW2 have been turned on, and thereby prevents the pallet 30 from moving further to the left side or further to the right side than its movable range allows. This control unit 37 may be realized, for example, by a microcomputer that is equipped with memory.

The electric vehicle 2 is provided with the storage battery 41, a power-supplying circuit 42 (i.e., a power converter), a power-supplying coil 43, and the wireless communication device 44 (i.e., a command output portion), and is able to supply the power that is stored in the storage battery 41 to the outside via the power-supplying coil 43. Note that, although omitted from the drawings, the electric vehicle 2 is provided with a motor that generates motive power that it uses for traveling, and the electric vehicle 2 is able to travel as a result of the motor being driven by power from the storage battery 41.

The storage battery 41 is a storage battery (for example, a secondary battery such as a lithium ion battery or a nickel hydrogen battery or the like) that is rechargeable and that is mounted in the electric vehicle 2, and supplies power that is used to drive a motor (not shown) that is provided in the electric vehicle 2. The power-supplying circuit 42 supplies power from the storage battery 41 wirelessly to the pallet 30 via the electromagnetic coupling circuit that is formed by the power-supplying coil 43 and the power-receiving coil 31 that is provided in the pallet 30. Specifically, the power-supplying circuit 42 is able to supply power wirelessly to the pallet 30 by converting the power (i.e., the DC power) that is supplied from the storage battery 41 into AC power, and then supplying this AC power to the power-supplying coil 43.

The power-supplying coil 43 is provided in an underside portion of the electric vehicle 2, and is used to supply power from the storage battery 41 wirelessly to the pallet 30. The aforementioned electromagnetic coupling circuit is formed as a result of this power-supplying coil 43 being placed adjacent to and opposite the power-receiving coil 31 that is provided in the pallet 30. The wireless communication device 44 is capable of wirelessly communicating various types of information with the wireless communication device 36 that is provided in the pallet 30. This wireless communication device 44, for example, transmits the aforementioned transfer command information to the wireless communication device 36.

The structure and operations of the aforementioned power-supplying circuit 42, power-supplying coil 43, power-receiving coil 31, and power-receiving circuit 32 are described in detail, for example, in Japanese Unexamined Patent Application (JP-A) No. 2009-225551 (Power Transmission System) and in Japanese Unexamined Patent Application (JP-A) No. 2008-236916 (Wireless Power Transmission Device).

Next, operations of the transfer device 1 and electric vehicle 2 having the above-described structure will be described. Operations of the transfer device 1 and the electric vehicle 2 are broadly separated into the following five steps: a parking step S1, a power supply starting step S2, a transfer starting step S3, a transfer completion step S4, and a power supply ending step S5). Hereinafter, the operations of each of these steps will be described in sequence.

[Parking Step S1]

Firstly, a driver drives the electric vehicle 2 so as to move the electric vehicle 2 backwards such that the electric vehicle 2 enters the entry/exit position E of the transfer device 1. The driver then causes the electric vehicle 2 to move on to the pallet 30 of the transfer device 1. Once the electric vehicle 2 has been loaded onto the pallet 30, the driver parks electric vehicle 2 in a position where power can be supplied wirelessly to the pallet 30. Note that once the electric vehicle 2 has been parked in such a position, an electromagnetic coupling circuit is formed as a result of the power-supplying coil 43 of the electric vehicle 2 and the power-receiving coil 31 of the pallet 30 being placed opposite each other.

Here, for example, the following methods (1) through (3) provide examples of a method that may be used to verify whether or not the electric vehicle 2 is parked at a position where it is able to supply power wirelessly to the pallet 30.

(1) A method in which it is confirmed whether or not a rear wheel of the electric vehicle 2 has come into contact with a buffer stop (not shown) on top of the pallet 30 that has been placed in a previously stipulated positional relationship relative to the power-receiving coil 31.

(2) A method in which it is confirmed whether or not the electric vehicle 2 has been parked in a stipulated position from image processing results of an image that is obtained by using a camera provided in the electric vehicle 2 to visual markers (not shown) that are provided in stipulated positions on the pallet 30.

(3) A method in which the driver confirms with their own eyes the positional relationship between the power-receiving coil 31 and the power-supplying coil 43.

Note that the wireless supply of power from the electric vehicle 2 to the pallet 30 does not start at the point when the electric vehicle 2 has been parked on the pallet 30 of the transfer device 1. Because of this, the supply of DC power from the power-receiving circuit 32 provided in the pallet 30 to the inverter 33 and the DC/DC converter 35 does not take place. Accordingly, at this point in time, the inverter 33, the electric motor 34, the DC/DC converter 35, the wireless communication device 36, and the control unit 37 that are provided in the pallet 30 are in a non-operating state.

[Power Supply Starting Step S2]

Next, while the electric vehicle 2 is stopped, if the driver issues a command to the electric vehicle 2 to start supplying power, the supply of power to the pallet 30 is started. Specifically, when a power supply start command is issued by the driver, a control unit (not shown) provided in the electric vehicle 2 causes the power-supplying circuit 42 to operate. As a result of this, power (i.e., DC power) stored in the storage battery 41 is supplied to the power-supplying circuit 42 and is converted into AC power. This converted AC power is then supplied to the power-supplying coil 43, and is then supplied wirelessly to the pallet 30 via the electromagnetic coupling circuit that is formed by the power-supplying coil 43 and the power-receiving coil 31.

The AC power supplied to the pallet 30 is converted into DC power by the power-receiving circuit 32, and this converted DC power is then supplied respectively to the inverter 33 and to the DC/DC converter 35. As a result of this, the DC/DC converter 35 begins to operate, and DC power is supplied from the DC/DC converter 35 to the wireless communication device 36 and to the control unit 37. As a consequence, the wireless communication device 36 and the control unit 37 also begin to operate.

[Transfer Starting Step S3]

Next, while power is being supplied from the electric vehicle 2 to the pallet 30, if the driver issues a transfer command to the electric vehicle 2 (i.e., a command for the electric vehicle 2 that is mounted on the pallet 30 to be moved in the Y direction (i.e., in the transfer direction)), information showing this transfer command (i.e., transfer command information) is transmitted from the wireless communication device 44 to the wireless communication device 36 provided in the pallet 30.

When the transfer command information transmitted from the wireless communication device 44 of the electric vehicle 2 is received by the wireless communication device 36, the control unit 37 provided in the pallet 30 confirms the state of the limit switches SW1 and SW2 and, at the same time, starts the control of the inverter 33. Specifically, when the limit switch SW1 is turned on, the control unit 37 controls the inverter 33 such that the electric motor 34 rotates normally (i.e., such that the pallet 30 is moved towards the right), while if the limit switch SW2 is turned on, the control unit 37 controls the inverter 33 such that the electric motor 34 rotates in reverse (i.e., such that the pallet 30 is moved towards the left).

[Transfer Completion Step S4]

While power is being supplied from the electric vehicle 2 to the pallet 30 and the electric vehicle 2 is being transferred, the control unit 37 provided in the pallet 30 continues to control the inverter 33 while continuously monitoring the states of the limit switches SW1 and SW2. Specifically, when the electric motor 34 is being controlled so as to rotate normally (i.e., when the pallet 30 is being controlled so as to move towards the right), this control is continued until the limit switch SW2 is turned on. On the other hand, when the electric motor 34 is being controlled so as to rotate in reverse (i.e., when the pallet 30 is being controlled so as to move towards the left), this control is continued until the limit switch SW1 is turned on.

If one of the limit switches SW1 and SW2 is turned on while the above-described control is being performed, the control unit 37 controls the inverter 33 so as to stop the electric motor 34. In addition, the control unit 37 controls the wireless communication device 36 so as to cause it to transmit transfer completion information (i.e., information showing that the transferring of the electric vehicle 2 that is mounted on the pallet 30 is complete). Note that once the above-described operations have ended, the pallet 30 has moved from one end portion (for example, from the left end portion) of the rails 10 to the other end portion (for example, to the right end portion) thereof

[Power Supply Ending Step S5]

When the transfer completion information transmitted from the wireless communication device 36 of the pallet 30 has been received by the wireless communication device 44 of the electric vehicle 2, a control unit (not shown) provided in the electric vehicle 2 causes the power-supplying circuit 42 to stop operating. As a result of this, the supplying of power from the electric vehicle 2 to the pallet 30 is stopped.

Consequently, the supplying of DC power from the power-receiving circuit 32 provided in the pallet 30 to the inverter 33 and the DC/DC converter 35 is also stopped. As a result of this, operations of the inverter 33, the electric motor 34, the DC/DC converter 35, the wireless communication device 36, and the control unit 37 that are provided in the pallet 30 are all stopped.

As is described above, in the present embodiment, the power-receiving coil 31 and the power-receiving circuit 32 that wirelessly receive power supplied from the electric vehicle 2 are provided in the pallet 30, and as a result of the electric motor 34 being driven using the power received by these so that the pallet 30 is moved along the rails 10, the electric vehicle 2 mounted on the pallet 30 can be transferred. Because of this, it is not necessary to lay a cable in order for power to be supplied to the electric motor 34, so that the cost of the device is kept to a minimum, and the device is easy to maintain. Moreover, because the supplying of power to the pallet 30 is performed wirelessly, it is possible to supply power stably without any contact malfunctions or short-circuiting or the like occurring.

Figure 3:
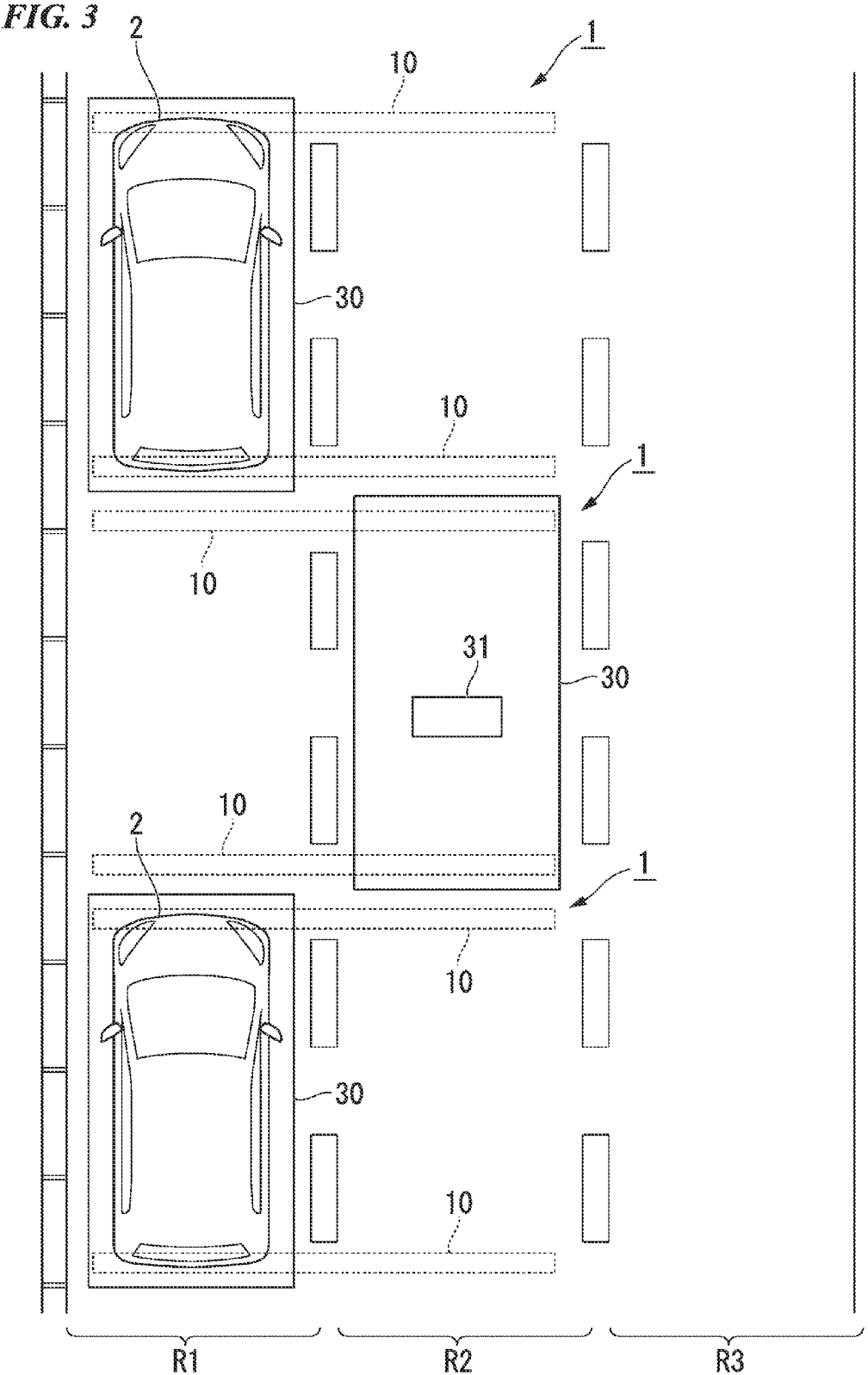
FIG. 3 is a view showing another example of the installation of the transfer device according to the first embodiment of the present invention.

Note that in the above-described embodiment, an example in which the transfer device 1 is installed in a parking lot is described, however, it is also possible for the transfer device to be installed in locations other than a parking lot. FIG. 3 is a view showing another example of the installation of a transfer device according to the first embodiment of the present invention. In the installation example shown in FIG. 3, a plurality of transfer devices 1 are installed immediately next to each other along a road that has a plurality of vehicle traffic lanes R1 to R3. The transfer devices 1 that are installed in this manner are able to achieve efficient longitudinal parking in the vehicle traffic lane R1 that is positioned furthermost to the left.

Specifically, each of the transfer devices 1 is arranged such that the rails 10 thereof are across the road, and such that the pallet 30 thereof is able to move reciprocating only between the vehicle traffic lane R1 and the vehicle traffic lane R2. Note that it is desirable for the rails 10 to be embedded within the ground such that they do not obstruct the passage of vehicles traveling along the vehicle traffic lanes R1 and R2. Moreover, although omitted from FIG. 3, it is also desirable for the stoppers 20a and 20b to be embedded in the ground in the same way as the rails 10.

In the transfer devices 1 that have been installed in the above-described manner, the pallet 30 that is not carrying an electric vehicle 2 is placed on the vehicle traffic lane R2 side. At this point, the driver of the electric vehicle 2 that is traveling along the vehicle traffic lane R2 stops the electric vehicle 2 above a pallet 30 that is located in the vehicle traffic lane R2. When the driver then issues a power supply start command and a transfer command in that sequence to the electric vehicle 2, the pallet 30 moves along the rails 10 to the vehicle traffic lane R1 so that the electric vehicle 2 is transferred to the vehicle traffic lane R1. By doing this the electric vehicle 2 can be moved in a straight line in the left-right direction transversely across the road so that, even if the driver has low-level driving skills, it is still possible to achieve efficient tandem parking with substantially no gaps between the parked electric vehicles 2.

Figure 4:
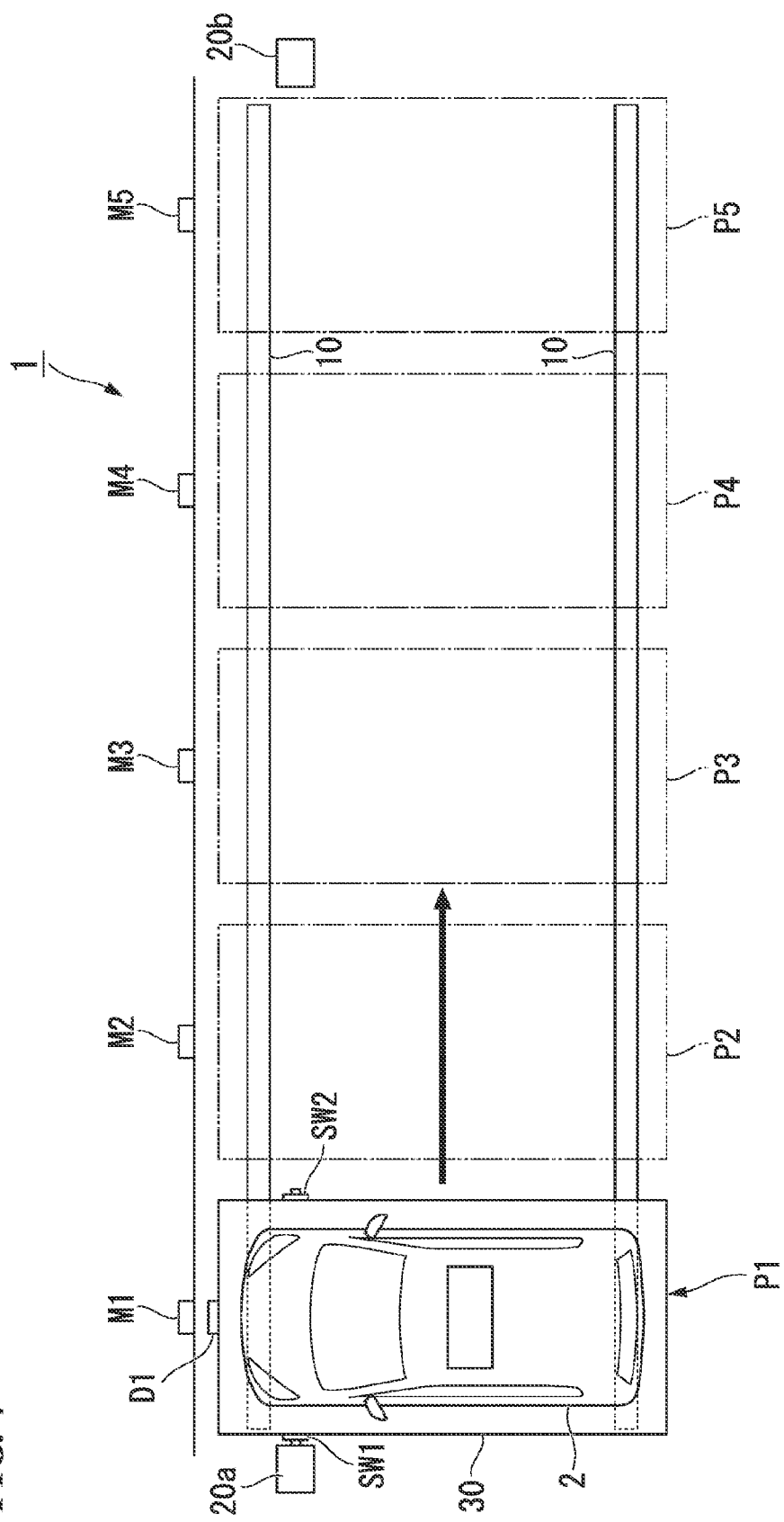
FIG. 4 is a view showing a variant example of the transfer device according to the first embodiment of the present invention.

Moreover, in the above-described embodiment, an example in which there are two stopping positions for the pallet 30 (i.e., a position where the limit switch SW1 comes into contact with the stopper 20a, and a position where the limit switch SW2 comes into contact with the stopper 20b) is described, however, it is also possible for there to be a plurality of stopping positions for the pallet 30. FIG. 4 shows a variant example of the transfer device according to the first embodiment of the present invention.

As is shown in FIG. 4, in the present variant example, five stopping positions (i.e., stopping positions P1 to P5) for the pallet 30 are set along the rails 10. Markers M1 to M5 that are used to specify the stopping positions are arranged along the rails 10 so as to correspond to each of the stopping positions P1 to P5. In addition, a sensor D1 that detects the markers M1 to M5 is attached to the pallet 30. An optical sensor, a magnetic sensor, a mechanical sensor, or any other type of sensor can be used for the sensor D1 provided that it is able to detect the markers M1 to M5.

In the above-described structure, the control unit 37 provided in the pallet 30 controls the inverter 33 while verifying the detection results from the sensor D1 in addition to verifying the states of the limit switches SW1 and SW2. While the pallet 30 is moving along the rails 10, each time the sensor D1 detects one of the markers M1 through M5, the detection result is input into the control unit 37. Consequently, if, for example, a command to transfer to the stopping position P3 is made from an electric vehicle 2 that has been loaded onto the pallet 30 that is stopped at the stopping position P1, the control unit 37 firstly causes the pallet 30 to start moving, and then when detection results from the sensor D1 have been input twice, control the inverter 33 so as to stop the electric motor 34. As a result of this, the electric vehicle 2 that is loaded on the pallet 30 is moved to the stopping position P3.

Second Embodiment

Figure 5A:
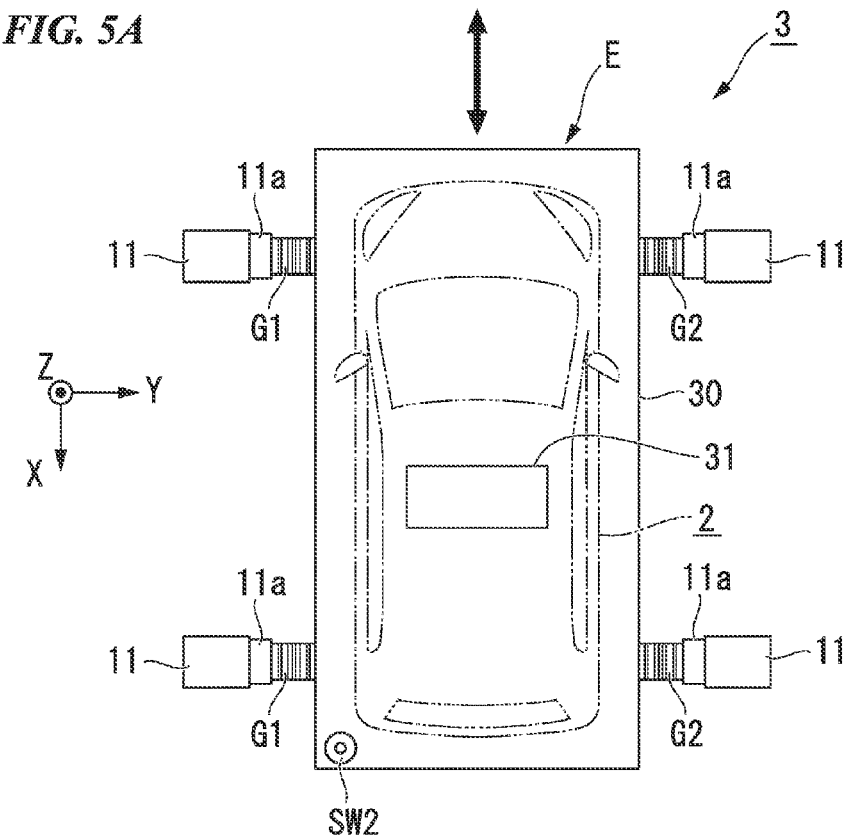
FIG. 5A is a view showing in simplified form the mechanical structure of a transfer device according to a second embodiment of the present invention.
Figure 5B:
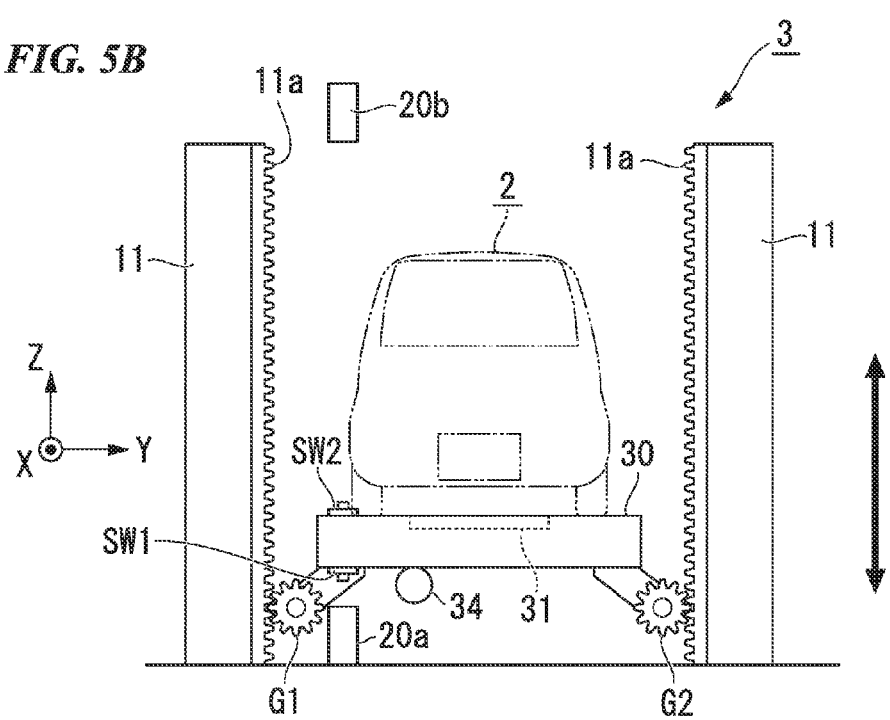
FIG. 5B is a view showing in simplified form the mechanical structure of the transfer device according to the second embodiment of the present invention.

FIG. 5A is a top view showing in simplified form the mechanical structure of a transfer device according to a second embodiment of the present invention, while FIG. 5B is a rear view of the same. Note that in FIGS. 5A and 5B, the same XYZ orthogonal coordinate system as the XYZ orthogonal coordinate system shown in FIGS. 1A and 1B is shown. While the transfer device 1 of the above-described first embodiment transferred an electric vehicle 2 that had been loaded onto the pallet 30 in the Y direction (i.e., in the left-right direction), the transfer device 3 of the present embodiment transfers an electric vehicle 2 that has been loaded onto the pallet 30 in the Z direction (i.e., in an up-down direction).

As is shown in FIGS. 5A and 5B, in brief, the transfer device 3 of the present embodiment is constructed such that, instead of the two rails 10 shown in FIGS. 1A and 1B that extend in the Y direction, it is provided with four racks 11a that extend in the Z direction, and, instead of the drive wheels W1 and the idle wheels W2 that are provided on the underside portion of the pallet 30, it is provided with drive pinions G1 and idle pinions G2. Moreover, in conjunction with this alteration to the structure, the placement of the limit switches SW1 and SW2 and of the stoppers 20a and 20b is also altered.

The four racks 11a are spur gears having an infinite radius (i.e., flat plate-shaped components in which the teeth are aligned rectilinearly), that make it possible for the pallet 30 to move in the Z direction while they support the weight of the pallet 30 (and also the weight of the electric vehicle 2 in addition to the weight of the pallet 30 when an electric vehicle 2 has been loaded thereon). These four racks 11a have a length that is substantially the same as the length of the range of allowable movement (i.e., the movable range) of the pallet 30. Two supporting columns 11 respectively are arranged adjacent to the left end side and to the right end side of the pallet 30, and each rack 11a is attached to a supporting column 11 such that the teeth thereof face towards the pallet 30 side.

The drive pinions G1 are small-diameter circular gears that are driven by the electric motor 34 while supporting the weight of the pallet 30 and the electric vehicle 2 so as to move the pallet 30 in the Z direction, and two drive pinions G1 are provided so as to correspond respectively to the two racks 11a that are provided on the left side of the pallet 30. The idle pinions G2 are small-diameter circular gears that support the weight of the pallet 30 and the electric vehicle 2, and two idle pinions G2 are provided so as to correspond respectively to the two racks 11a that are provided on the right side of the pallet 30. Note that it is also possible to provide drive pinions G1 instead of the idle pinions G2, so that all four pinions are drive pinions G1.

Here, the stopper 20a is provided on the ground surface underneath the pallet 30, while the stopper 20b is provided above the pallet 30 (for example, on the ceiling above the pallet 30). In conjunction with this, the limit switch SW1 is provided on the underside surface of the pallet 30 such that it is able to be pressed against the stopper 20a, while the limit switch SW2 is provided on the top surface of the pallet 30 such that it is able to be pressed against the stopper 20b. If the position of the pallet 30 cannot be fixed simply by the driving force of the electric motor 34 alone, then it is also possible for a mechanism that prevents the pallet 30 from dropping down to be provided. For example, a friction brake that operates by means of springs, or a locking device that inserts an engaging pin into a hole may also be provided.

The basic operation of transfer device 3 having the above-described structure is the same as in the first embodiment and only differs therefrom in that the transfer direction of the pallet 30 (i.e., the transfer direction of the electric vehicle 2) is altered from the Y direction to the Z direction. Namely, the parking step S1, the power supply starting step S2, the transfer starting step S3, the transfer completion step S4, and the power supply ending step S5 that were described in the first embodiment are performed. For this reason, a detailed description thereof will be omitted here.

As is described above, in the present embodiment, the power-receiving coil 31 and the power-receiving circuit 32 that wirelessly receive power that is supplied from the electric vehicle 2 are provided in the pallet 30, and the electric motor 34 is driven using power received by these so that the pallet 30 is able to move along the racks 11a, and so that the electric vehicle 2 that has been loaded onto the pallet 30 is able to be transferred. Because of this, there is no need for a cable to be laid in order to supply power to the electric motor 34, so that the cost of the device is kept to a minimum, and the device is easy to maintain. Moreover, because the supplying of power to the pallet 30 is performed wirelessly, it is possible to supply power stably without any contact malfunctions or short-circuiting or the like occurring. Note that in the present embodiment as well, in the same way as the variant example of the first embodiment (see FIG. 4), it is possible for the pallet 30 to have a plurality of stopping positions.

Third Embodiment

Figure 6:
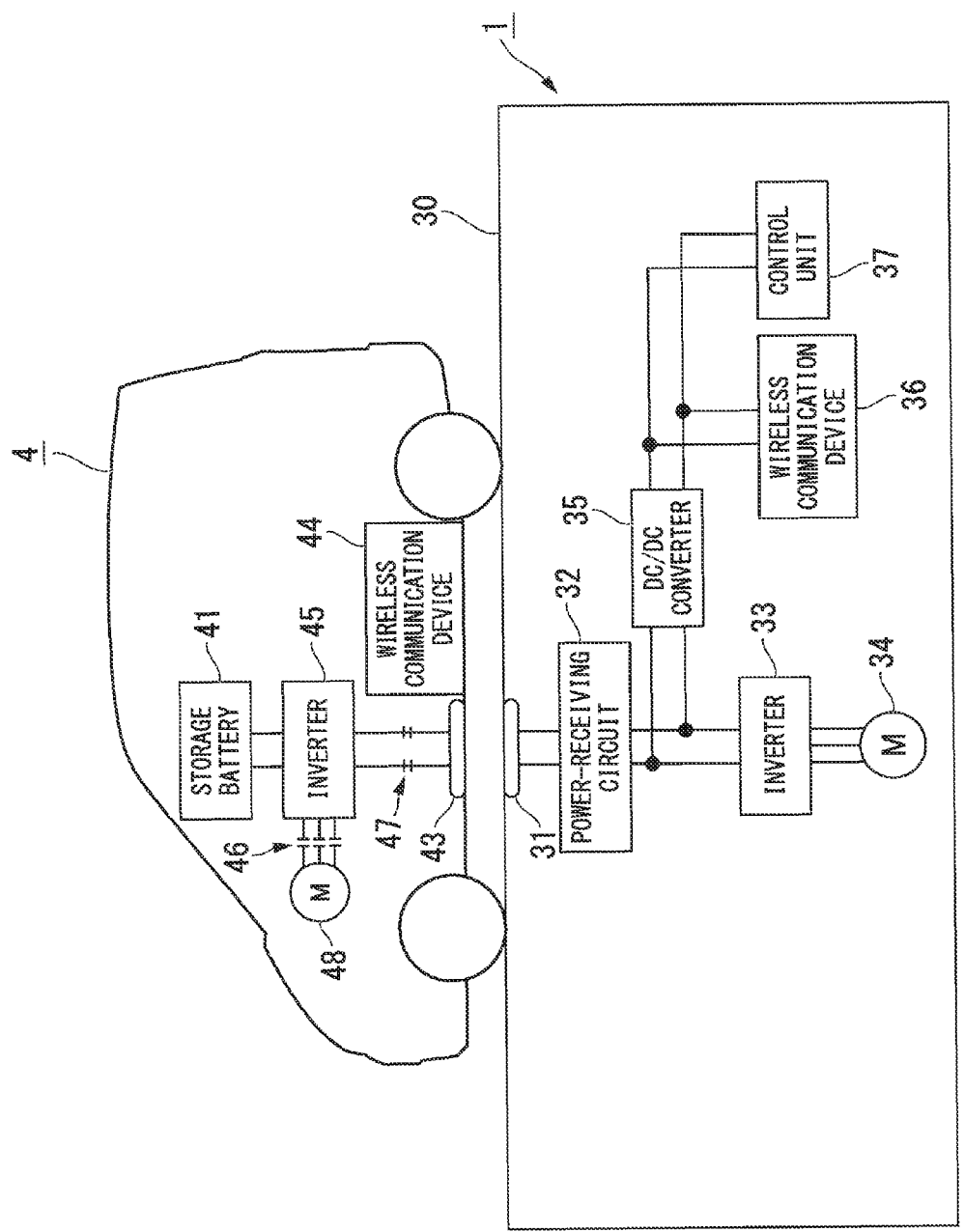
FIG. 6 is a block diagram showing the electrical structure of the transfer device and vehicle according to a third embodiment of the present invention.

FIG. 6 is a block diagram showing the electrical structure of a transfer device and a vehicle according to a third embodiment of the present invention. Note that in FIG. 6, in the same way as in FIG. 2, only the pallet 30 of the transfer device 1 is shown.

The electric vehicle 2 according to the above-described first embodiment supplies power to a motor (not shown) that serves as a power source and supplies power to the power-supplying coil 43 using mutually different circuits, namely, it uses an inverter (not shown) to supply power to the aforementioned motor, and it uses the power-supplying circuit 42 to supply power to the power-supplying coil 43. However, an electric vehicle 4 of the present embodiment uses an inverter 45 to supply power both to the power-supplying coil 43 and to a motor 48 (see FIG. 6). The transfer device 1 according to the present embodiment is the same as in the first embodiment.

As is shown in FIG. 6, the electric vehicle 4 is constructed such that an inverter 45 (i.e., a power converter) is provided instead of the power-supplying circuit 42 of the electric vehicle 2 shown in FIG. 2, and such that a first contactor 46 and a second contactor 47 are provided.

The inverter 45 converts the power (i.e., DC power) supplied from the storage battery 41 into three-phase or two-phase AC power based on gate signals that are input from a gate drive circuit 50 (described below—see FIG. 7). When the electric vehicle 4 is travelling (i.e., when the inverter 45 is connected to the motor 48 by the first contactor 46), this three-phase AC power (i.e., U phase, V phase, and W phase AC power) is then supplied to the motor 48. When the power is instead to be supplied to the transfer device 1 (i.e., when the inverter 45 is connected to the power-supplying coil 43 by the second contactor 47), two-phase AC power (i.e., U phase and V phase AC power) is supplied to the power-supplying coil 43. Moreover, it is also possible for the inverter 45 to convert regenerated power generated in the motor 48 into DC power, and then to charge the storage battery 41 using this DC power. Namely, the inverter 45 may also be a bi-directional power converter.

The first contactor 46 is provided between the inverter 45 and the motor 48 and, under the control of a controller 51 (described below—see FIG. 7), switches the state of connection between the inverter 45 and the motor 48 between a connected state and a disconnected state. Specifically, when the electric vehicle 4 is traveling, the first contactor 46 changes to a closed state in order to connect the inverter 45 to the motor 48, and when the electric vehicle 4 is stopped, changes to an open state in order to disconnect the inverter 45 from the motor 48.

The second contactor 47 is provided between the inverter 45 and the power-supplying coil 43 and, under the control of the controller 51 (described below—see FIG. 7) switches the state of connection between the inverter 45 and the power-supplying coil 43 between a connected state and a disconnected state. Specifically, when power is being supplied to the transfer device 1, the second contactor 47 changes to a closed state in order to connect the inverter 45 to the power-supplying coil 43, and when the supply of power to the transfer device 1 is stopped, changes to an open state in order to disconnect the inverter 45 from the power-supplying coil 43.

The motor 48 is mounted in the electric vehicle 4 so as to serve as a power generation source that generates motive power that is used to enable the electric vehicle 4 to move, and generates this motive power in response to the driving of the inverter 45. A motor such as permanent magnet synchronous motor, an induction motor and the like can be used as the motor 48.

Figure 7:
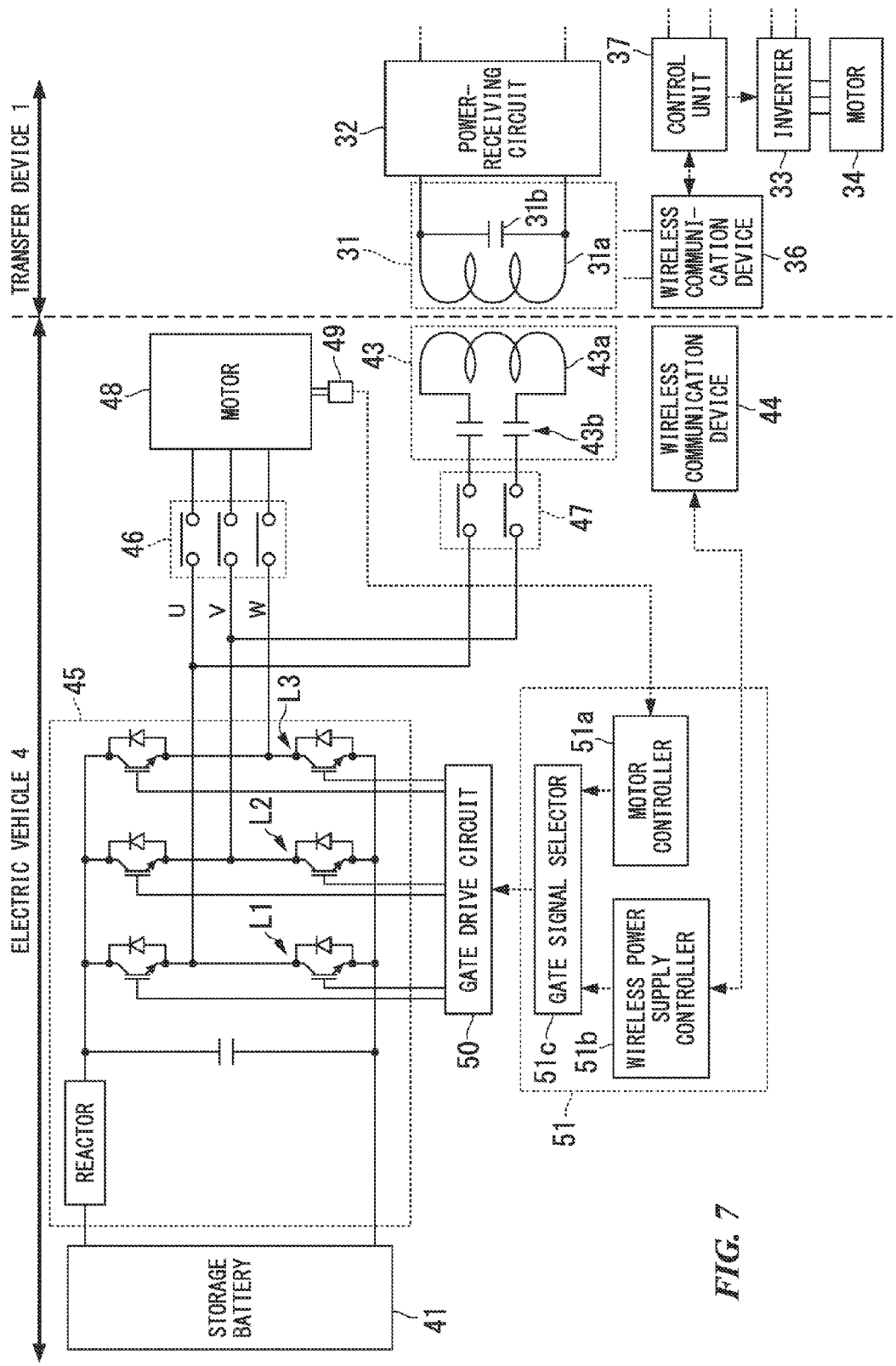
FIG. 7 is a view showing in detail a control system according to the third embodiment of the present invention as well as component elements that are controlled by this control system.

FIG. 7 is a view showing in detail a control system of the electric vehicle 4 and also the component elements that are controlled by this control system according to the third embodiment. Note that in FIG. 7, the same symbols are attached to structure that is the same as the structure shown in FIG. 6. As is shown in FIG. 7, the inverter 45 of the above-described electric vehicle 4 is realized by a circuit in which three switching legs L1, L2, and L3 that are used to output U-phase, V-phase, and W-phase AC power are connected in parallel (each switching leg comprises of two transistors connected in series, and a diode connected in parallel to each of these two transistors). Note that IGBT (Insulated Gate Bipolar Transistors) or power MOSFET (Metal-Oxide-Semiconductor Field-Effect Transistors) or the like can be used for the transistors.

Moreover, the inverter 45 is also provided with a smoothing circuit that comprises of a smoothing reactor and a smoothing capacitor and is located between the switching legs L1, L2, and L3 and the storage battery 41.

Moreover, as is shown in FIG. 7, the power-supplying coil 43 comprises of a coil 43a and two capacitors 43b. The capacitors 43b together with the coil 43a form a series resonant circuit. One end of the coil 43a is connected to the switching leg L1 via one of the capacitors 43b and the second contactor 47, while the other end of the coil 43a is connected to the switching leg L2 of the inverter 45 via the other capacitor 43b and the second contactor 47.

As is shown in FIG. 7, in addition to the above-described structure, the electric vehicle 4 is also provided with a rotation angle detector 49, a gate drive circuit 50, and the controller 51. Note that the gate drive circuit 50, the controller 51, the first contactor 46, and the second contactor 47 form the power supply destination setting device of the present embodiment.

The rotation detector 49 is a sensor that detects the rotation of the motor 48, and outputs a detection signal to the controller 51. For example, the rotation detector 49 detects the rotation angle when the motor 48 is rotating using an encoder, and outputs to the controller 51a pulse signal (i.e., a detection signal) that contains a predetermined number of pulses (for example, 65536 pulses) each time the rotor of the motor 48 completes one rotation.

The gate drive circuit 50 is provided between the inverter 45 and the controller 51, and converts the voltage of gate signals that are input from the controller 51, and then outputs the result to the inverter 45. Moreover, because the gate drive circuit 50 is provided between the inverter 45 and the controller 51, it also has the role of insulating the inverter 45 from the controller 51.

The controller 51 is realized by a microcontroller or the like, and controls the inverter 45, the first contactor 46, and the second contactor 47 and the like based on control programs that are stored in it. For example, when a travel command is input by an operation of the driver via an operating device (not shown), the controller 51 controls the first contactor 46 so that the inverter 45 and the motor 48 are connected to each other. If, on the other hand, a start power-supply command is input by the operation of the driver via the operating device (not shown), the controller 51 controls the second contactor 47 so that the inverter 45 and the power-supplying coil 43 are connected to each other.

This controller 51 comprises of three functional component elements, namely, a motor controller 51a, a wireless power supply controller 51b, and a gate signal selector 51c that correspond to operations of the microcontroller to control the inverter 45.

When a travel command is input by an operation of the driver via an operating device (not shown), in order to create in the inverter 45 the three-phase AC power (i.e., U-phase, V-phase, and W-phase AC power) that is used to drive the motor 48 to rotate, the motor controller 51a creates a gate signal that corresponds to the U-phase, V-phase, and W-phase AC power, and outputs this gate signal to the gate signal selector 51c at the same time as it monitors detection results from the rotation detector 49.

When a start power supply command is input by an operation of the driver via the operating device, in order to create in the inverter 45 the two-phase AC power (i.e., U-phase and V-phase AC power) that is used to supply power to the power-supplying coil 43, the wireless power supply controller 51b creates a gate signal that corresponds to the U-phase and V-phase AC power, and outputs this gate signal to the gate signal selector 51c. At this time, the wireless power supply controller 51b turns the transistor of the switching leg L3 of the inverter 45 to OFF without creating a gate signal that corresponds to the W-phase AC power.

When power is being supplied from the electric vehicle 4 to the pallet 30, then if the driver issues a transfer command to the electric vehicle 4 (i.e., a command to cause the electric vehicle 4 that has been loaded onto the pallet 30 to be transferred in the Y direction (i.e., in the transfer direction)), the wireless power supply controller 51b causes the wireless communication device 44 to transmit information that shows this transfer command (i.e., transfer command information) to the pallet 30. Moreover, when the wireless communication device 44 receives transfer completion information that is transmitted from the pallet 30, the wireless power supply controller 51b stops the gate signal that is necessary in order for the two-phase AC power that is supplied to the power-supplying coil 43 to be created from being created in the inverter 45.

The gate signal selector 51c selects either the gate signal input by the motor controller 51a or the gate signal input by the wireless power supply controller 51b, and outputs the selected gate signal to the gate drive circuit 50. Namely, if a travel command is input by an operation of the driver via an operating device, the gate signal selector 51c only outputs the gate signal from the motor controller 51a to the gate drive circuit 50, and if a start power supply command is input by an operation of the driver via the operating device, the gate signal selector 51c only outputs the gate signal from the wireless power supply controller 51b to the gate drive circuit 50.

Moreover, as is shown in FIG. 7, the power-receiving coil 31 of the transfer device 1 comprises of a coil 31a and a capacitor 31b. The capacitor 31b is connected in parallel between the coil 31a and the power-receiving circuit 32.

Figure 8:
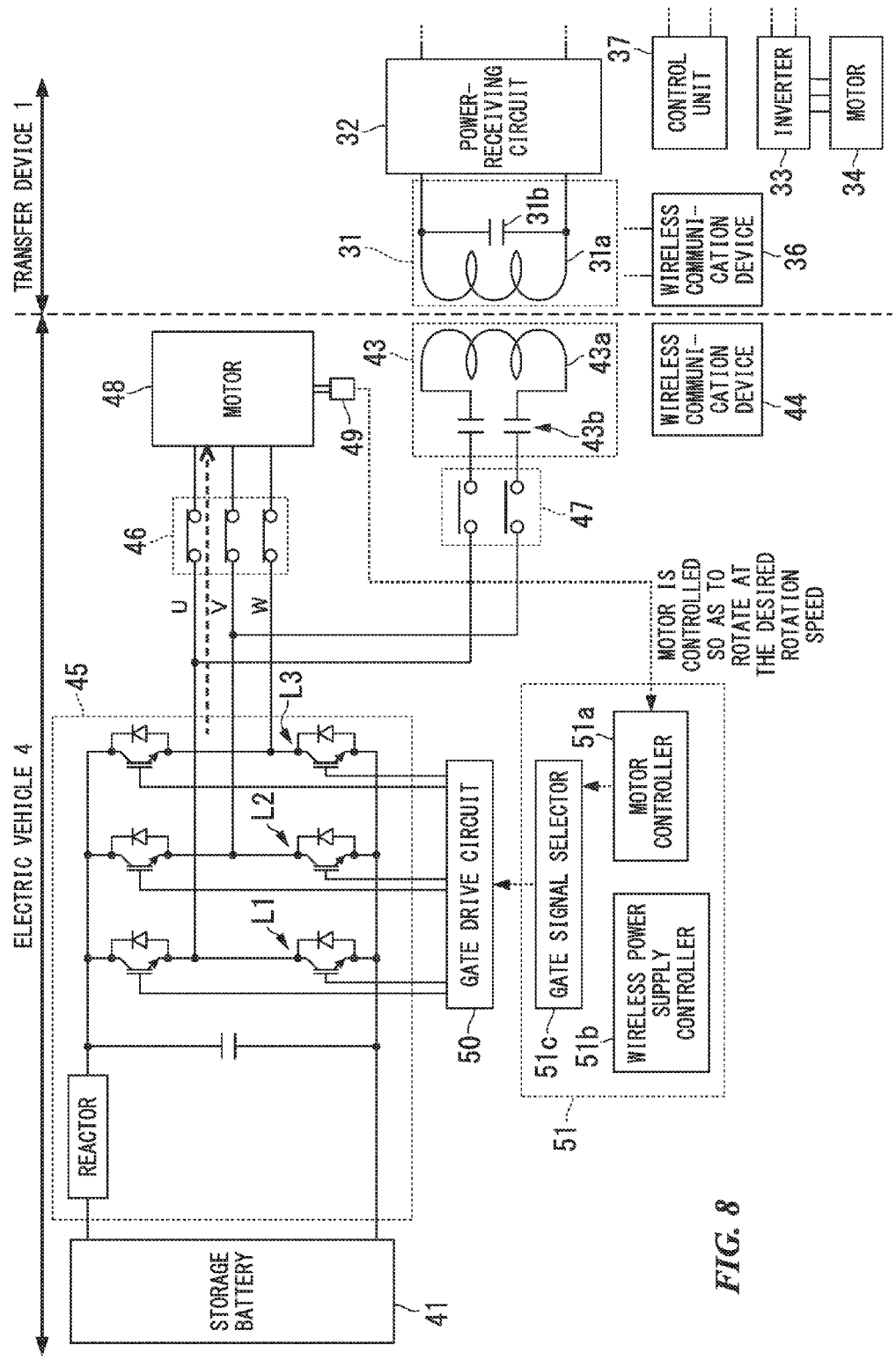
FIG. 8 is a view illustrating an operation according to the third embodiment of the present invention.
Figure 9:
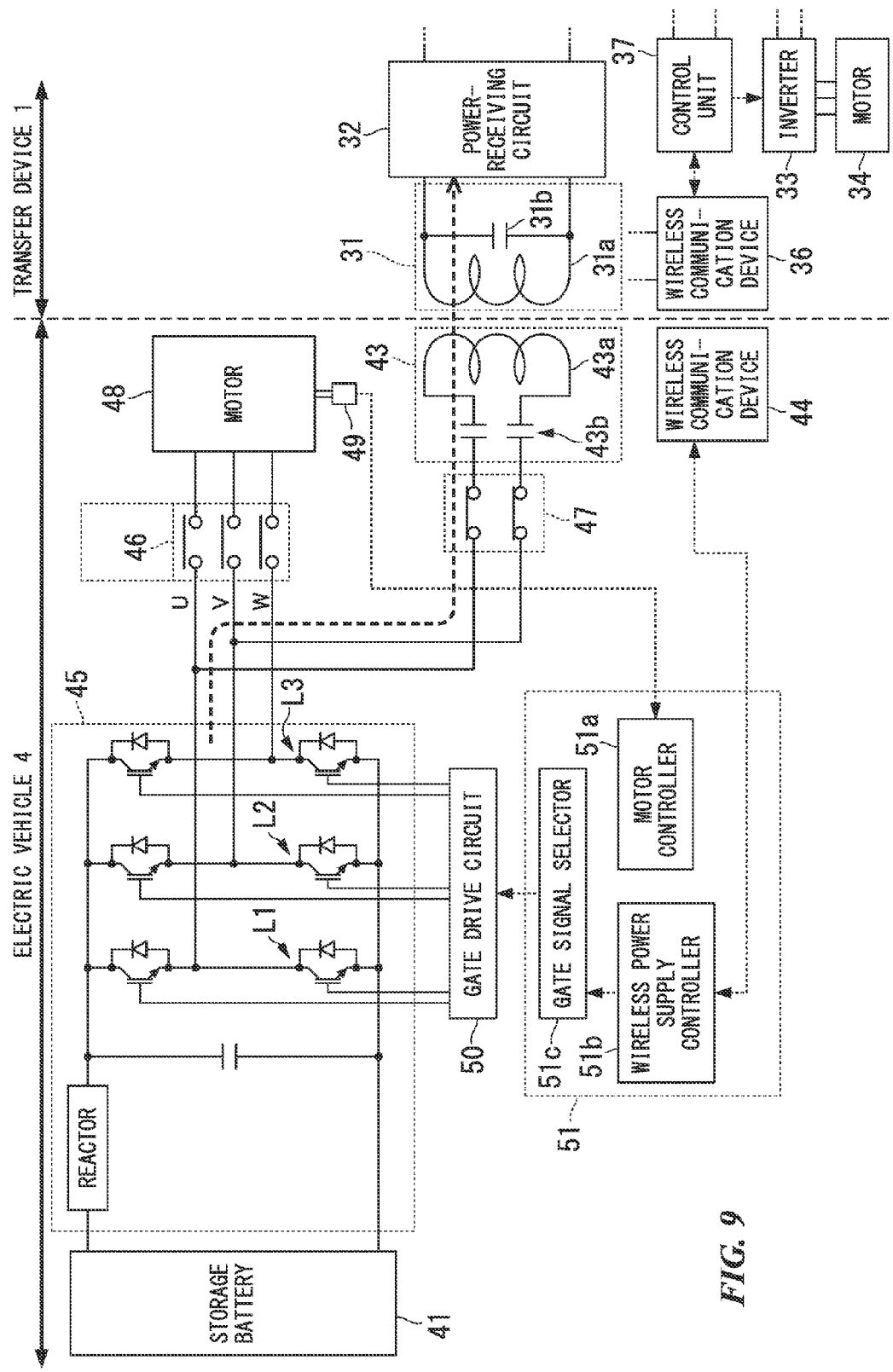
FIG. 9 is a view illustrating an operation according to the third embodiment of the present invention.

Next, operations of the electric vehicle 4 having the above-described structure will be described. FIG. 8 and FIG. 9 are views illustrating operations of the third embodiment of the present invention. Note that FIG. 8 is a view illustrating an operation that is performed when electric vehicle 4 is traveling, while FIG. 9 is a view illustrating an operation that is performed when power is supplied to the transfer device 1. Hereinafter, each of these operations will be described in sequence.

[Operation Performed During Traveling]

When a user starts driving the electric vehicle 4, the controller 51 switches the first contactor 46 to a closed state so that the motor 48 and the inverter 45 are connected together, and also switches the second contactor 47 to an open state so that the power-supplying coil 43 and the inverter 45 are disconnected from each other. In addition, while monitoring the detection results from the rotation detector 49, the motor controller 51a of the controller 51 creates the gate signal that is required to create in the inverter 45 the three-phase AC power (i.e., the U-phase, the V-phase, and the W-phase AC power) that is used to drive the motor 48 to rotate at the desired rotation speed, and then outputs this gate signal to the gate signal selector 51c.

Next, the gate signal selector 51c selects only the gate signal input from the motor controller 51a, and outputs this to the gate drive circuit 50. The gate drive circuit 50 converts the voltage of the gate signal that was input from the gate signal selector 51c, and then outputs it to the inverter 45. The inverter 45 creates three-phase AC power (i.e., U-phase, V-phase, and W-phase AC power) from the power (i.e., the DC power) stored in the storage battery 41 based on the gate signal input from the gate drive circuit 50, and supplies this three-phase AC power to the motor 48. As a result of this power being supplied from the inverter 45 to the motor 48, the motor 48 is driven and the electric vehicle 4 starts to travel.

[Operation Performed when Power is Supplied to the Transfer Device 1]

Operations of the transfer device 1 and the electric vehicle 4 are broadly separated into the following five steps: a parking step S11, a power supply starting step S12, a transfer starting step S13, a transfer completion step S14, and a power supply ending step S15). Hereinafter, the operations of each of these steps will be described in sequence.

[Parking Step S11]

Firstly, a driver drives the electric vehicle 4 so as to move the electric vehicle 4 backwards such that the electric vehicle 4 enters the entry/exit position E of the transfer device 1. The driver then causes the electric vehicle 4 to move on to the pallet 30 of the transfer device 1. Once the electric vehicle 4 has been loaded onto the pallet 30, the driver parks the electric vehicle 4 in a position where it is able to supply power wirelessly to the pallet 30. Note that the method used to verify whether or not the electric vehicle 4 is parked in a position where it is able to supply power wirelessly to the pallet 30 is the same as in the first embodiment.

The wireless supply of power from the electric vehicle 4 to the pallet 30 does not start at the point when the electric vehicle 4 has been parked on the pallet 30 of the transfer device 1. Accordingly, in the same way as in the first embodiment, at this point in time, the inverter 33, the electric motor 34, the DC/DC converter 35, the wireless communication device 36, and the control unit 37 that are provided in the pallet 30 are in a non-operating state.

[Power Supply Starting Step S12]

Next, while the electric vehicle 4 is stopped, if the driver issues a command to the electric vehicle 4 to start supplying power, the supply of power to the transfer device 1 is started. Specifically, when a power supply start command is issued by the driver, the controller 51 changes the first contactor 46 to an open state so that the motor 48 and the inverter 45 are disconnected from each other, and also changes the second connector 47 to a closed state so that the power-supplying coil 43 and the inverter 45 are connected to each other. In addition, the wireless power supply controller 51b of the controller 51 creates a gate signal that is required in order for the two-phase AC power (i.e., U-phase and V-phase AC power) that is supplied to the power-supplying coil 43 to be created in the inverter 45, and outputs this gate signal to the gate signal selector 51c.

Next, the gate signal selector 51c selects only the gate signal input from the wireless power supply controller 51b, and outputs this to the gate drive circuit 50. The gate drive circuit 50 converts the voltage of the gate signal that was input from the gate signal selector 51c, and then outputs it to the inverter 45. The inverter 45 creates two-phase AC power (i.e., U-phase and V-phase AC power) from the power (i.e., the DC power) stored in the storage battery 41 based on the gate signal input from the gate drive circuit 50, and supplies this two-phase AC power to the power-supplying coil 43. As a result, the AC power is supplied wirelessly to the pallet 30 via the electromagnetic coupling circuit that is formed by the power-supplying coil 43 and the power-receiving coil 31.

The AC power supplied to the pallet 30 is converted into DC power by the power-receiving circuit 32, and this converted DC power is then supplied respectively to the inverter 33 and to the DC/DC converter 35. As a result of this, the DC/DC converter 35 begins to operate, and DC power is supplied from the DC/DC converter 35 to the wireless communication device 36 and to the control unit 37. As a consequence, the wireless communication device 36 and the control unit 37 also begin to operate.

[Transfer Starting Step S13]

Next, while power is being supplied from the electric vehicle 4 to the pallet 30, if the driver issues a transfer command to the electric vehicle 4 (i.e., a command for the electric vehicle 4 that is mounted on the pallet 30 to be moved in the Y direction (i.e., in the transfer direction)), the wireless power supply controller 51*b* causes the wireless communication device 4 to transmit information showing this transfer command (i.e., transfer command information) to the wireless communication device 36 provided in the pallet 30.

When the transfer command information transmitted from the wireless communication device 44 of the electric vehicle 4 is received by the wireless communication device 36, the control unit 37 provided in the pallet 30 confirms the state of the limit switches SW1 and SW2 and, at the same time, starts the control of the inverter 33. Specifically, when the limit switch SW1 is turned on, the control unit 37 controls the inverter 33 such that the electric motor 34 rotates normally (i.e., such that the pallet 30 is moved towards the right), while if the limit switch SW2 is turned on, the control unit 37 controls the inverter 33 such that the electric motor 34 rotates in reverse (i.e., such that the pallet 30 is moved towards the left).

[Transfer Completion Step S14]

While power is being supplied from the electric vehicle 4 to the pallet 30 and the electric vehicle 4 is being transferred, the control unit 37 provided in the pallet 30 continues to control the inverter 33 while continuously monitoring the states of the limit switches SW1 and SW2. Specifically, when the electric motor 34 is being controlled so as to rotate normally (i.e., when the pallet 30 is being controlled so as to move towards the right), this control is continued until the limit switch SW2 is turned on. On the other hand, when the electric motor 34 is being controlled so as to rotate in reverse (i.e., when the pallet 30 is being controlled so as to move towards the left), this control is continued until the limit switch SW1 is turned on.

If one of the limit switches SW1 and SW2 changes to ON while the above-described control is being performed, the control unit 37 controls the inverter 33 so as to stop the electric motor 34. In addition, the control unit 37 controls the wireless communication device 36 so as to cause it to transmit transfer completion information (i.e., information showing that the transferring of the electric vehicle 4 that is mounted on the pallet 30 is complete). Note that once the above-described operations have ended, the pallet 30 has moved from one end portion (for example, from the left end portion) of the rails 10 to the other end portion (for example, to the right end portion) thereof

[Power Supply Ending Step S15]

In the electric vehicle 4, when the wireless communication device 44 receives the transfer completion information transmitted from the wireless communication device 36 of the pallet 30, the wireless power supply controller 51*b* stops the gate signal that is necessary in order for the two-phase AC power (i.e., the U-phase and the V-phase AC power) that is supplied to the power-supplying coil 43 to be created from being created in the inverter 45. As a result of this, the supplying of power from the electric vehicle 4 to the pallet 30 is stopped.

Consequently, the supplying of DC current from the power-receiving circuit 32 provided in the pallet 30 to the inverter 33 and the DC/DC converter 35 is also stopped. As a result of this, operations of the inverter 33, the electric motor 34, the DC/DC converter 35, the wireless communication device 36, and the control unit 37 that are provided in the pallet 30 are all stopped.

As is described above, in the present embodiment, the power-receiving coil 31 and the power-receiving circuit 32 that wirelessly receive power supplied from the electric vehicle 4 are provided in the pallet 30, and as a result of the electric motor 34 being driven using the power received by these so that the pallet 30 is moved along the rails 10, the electric vehicle 4 mounted on the pallet 30 can be transferred. Because of this, it is not necessary to lay a cable in order for power to be supplied to the electric motor 34, so that the cost of the device is kept to a minimum, and the device is easy to maintain. Moreover, because the supplying of power to the pallet 30 is performed wirelessly, it is possible to supply power stably without any contact malfunctions or short-circuiting or the like occurring.

Moreover, in the present embodiment, because the inverter 45 is used to supply power to both the motor 48 and the power-supplying coil 43, manufacturing costs for the electric vehicle 4 can be kept in check.

Note that, in the same way as in the first embodiment, the transfer device 1 of the above-described third embodiment can be installed in locations other than a parking lot, as is shown in FIG. 3. Moreover, the transfer device 1 of the above-described third embodiment can also be applied to the variant example shown in FIG. 4.

The transfer device and vehicle according to embodiments of the present invention have been described above, however, the present invention is not limited to the above-described embodiments and various modifications can be freely made insofar as they do not depart from the spirit or scope of the present invention. For example, in the above-described first and third embodiments the pallet 30 is moved by a combination of the rails 10 and wheels (i.e., the drive wheels W1 and the idle wheels W2), however, in order to prevent any slipping, it is also possible to move the pallet 30 using a combination of a similar type of rack and pinion as in the second embodiment.

Figure 10:
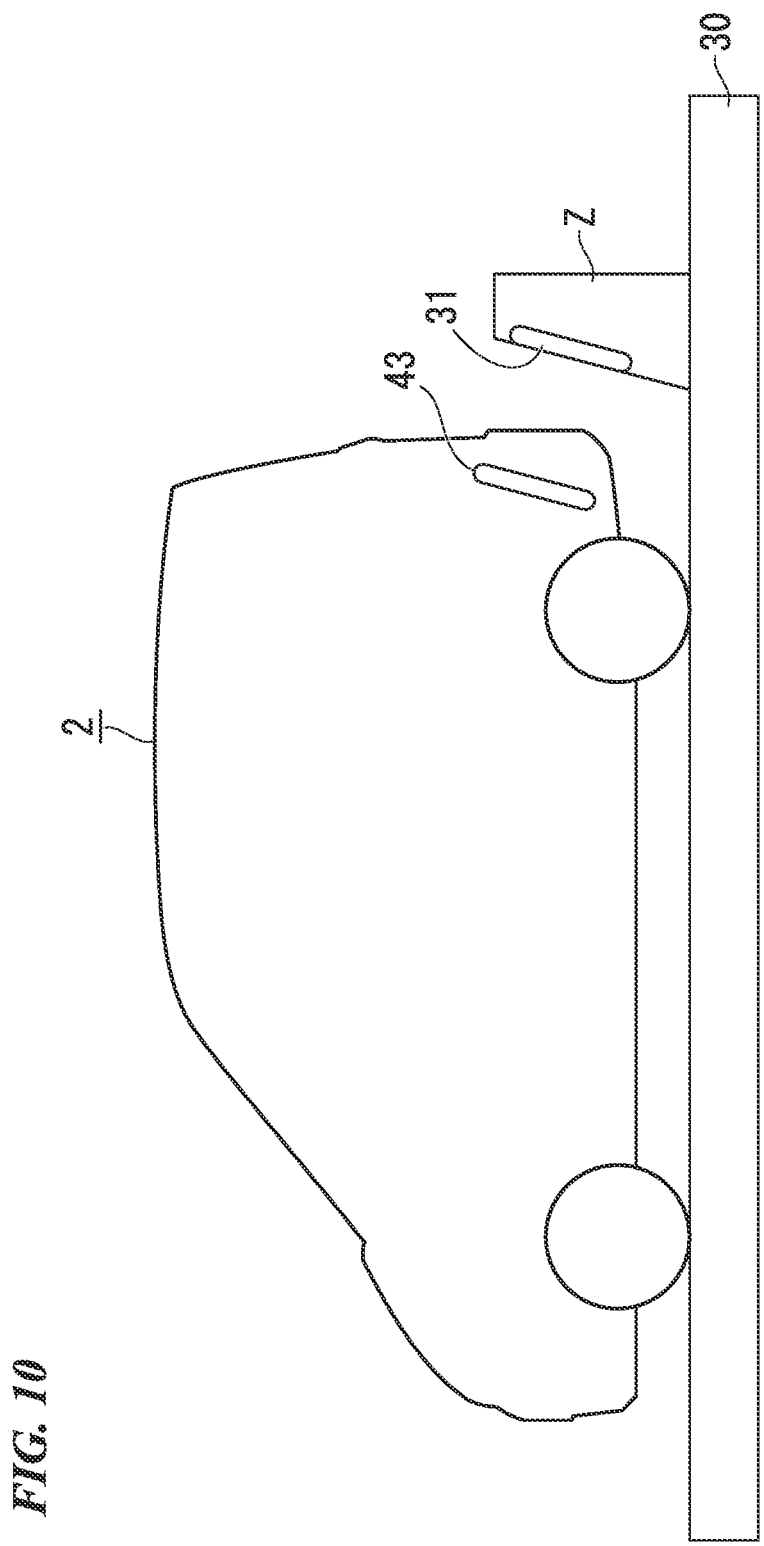
FIG. 10 is a view showing another example of the placement of a power-supplying coil and a power-receiving coil.

Moreover, in the above-described first through third embodiments, examples in which the power-receiving coil 31 is provided on the top surface of the pallet 30, and the power-supplying coil 43 is provided in an underside portion of the electric vehicles 2 and 4 are described, however, provided that power is able to be supplied wirelessly from the power-supplying coil 43 to the power-receiving coil 31, then the placement of the power-receiving coil 31 and the power-supplying coil 43 is not limited to this arrangement. FIG. 10 shows another example of the placement of a power-supplying coil and a power-receiving coil.

If the electric vehicle 2 (or the electric vehicle 4) is only able to be loaded onto and unloaded from the pallet 30 from the front side thereof or only from the rear side thereof, then as is shown in FIG. 10, it is also possible to provide a supporting pedestal Z on the top surface of the pallet 30 and to set up the power-receiving coil 31 either in an inclined state relative to a horizontal plane or perpendicularly to a horizontal plane. In addition, the power-supplying coil 43 may be installed in the rear portion of the underside of the electric vehicle 2 (or of the electric vehicle 4) either in an inclined state relative to a horizontal plane or perpendicularly to a horizontal plane in order to be opposite the power-receiving coil 31 that has been set up in either of these states.

Moreover, in the above-described first through third embodiments, the power-receiving coil 31 is provided in a central portion of the pallet 30, however, provided that it is located in a position where it is opposite the power-supplying coil 43 that is provided in the underside portion of the electric vehicles 2 and 4, then it does not need to be located in a central portion. For example, it is also possible to place the power-receiving coil 31 on the top surface of the pallet 30 in a position having a larger X coordinate when viewed in FIG. 1A, and to place the power-supplying coil 43 in a rear portion of the underside of the electric vehicle. Conversely, it is also possible to place the power-receiving coil 31 on the top surface of the pallet 30 in a position having a smaller X coordinate when viewed in FIG. 1A, and to place the power-supplying coil 43 in a front portion of the underside of the electric vehicle.

Moreover, in the above-described embodiments, a case in which the electric vehicles 2 and 4 were used to supply power from the storage battery 41 wirelessly to the outside principally via the power-supplying coil 43 was described. However, it is also possible to employ a structure in which power that is supplied wirelessly from the outside via the power-supplying coil 43 provided in the electric vehicles 2 and 4 is able to be received, and the storage battery 41 can be charged using this received power. Details of a circuit that makes it possible to achieve this type of bidirectional wireless power supply are disclosed, for example, in Japanese Unexamined Patent Application (JP-A) No. 8-19985 ("Robot Device")

Moreover, in the above-described embodiments, an example is described in which: in the parking steps S1 and S11, a driver drives the electric vehicles 2 and 4 so as to move the electric vehicles 2 and 4 onto the pallet 30 where they are then parked; in the power supply starting steps S2 and S12, the driver issues a power supply start command to the electric vehicles 2 and 4; and in the transfer starting steps S3 and S13, the driver issues a transfer command to the electric vehicles 2 and 4. However, it is also possible to automate the steps from the parking steps S1 and S11 through to the transfer starting steps S3 and S13 so that even if the driver does not drive the electric vehicles 2 and 4 or issue commands to the electric vehicles 2 and 4, the electric vehicles 2 and 4 are transferred automatically by the transfer devices 1 and 3.

Moreover, it is also possible to provide in advance a small-capacity power supply that is used to drive the control circuits that are provided internally in the power-receiving circuit 32 and the DC/DC converter 35 that are provided in the pallet 30 shown in FIG. 2 (or in FIG. 6). A power-generating device that generates power using natural energy such as solar light or wind power or the like may be used for this small-capacity power source, or, alternatively, a small-size storage battery may be used. If a small-size storage battery is used, then it is desirable for this to be charged using power supplied from the electric vehicle 2.

Moreover, in the above-described embodiments, a case in which a single vehicle is loaded onto a pallet is described as an example, however, if a plurality of vehicles are loaded onto pallets, then a common power source can be used to drive the pallets, and a reduction in the surface area of the installation space can be achieved.

Moreover, in a transfer device that is designed to transfer a plurality of vehicles loaded on a single pallet, then the charging power of any one electric vehicle can be supplied from the storage battery of another electric vehicle via the power-receiving circuit.

Furthermore, in the second embodiment, by converting potential energy into rotational energy using a rack and pinion mechanism, the drive motor 34 can be used as a regenerative power mechanism when the pallet is being lowered, so that, ultimately, this can be used as a power supply source for the vehicle.

Moreover, in the above-described embodiments, a case in which the vehicle is an electric vehicle in which the storage battery 41 is mounted is described as an example, however, the present invention can also be applied to plug-in hybrid vehicles, and can also be applied to electrically-driven carrier vehicles and electric wheelchairs and the like. Furthermore, the present invention can also be applied to automated vehicles.

INDUSTRIAL APPLICABILITY

According to the present invention, a power-receiving coil and a power-receiving circuit that are used to wirelessly receive power that is supplied from the outside, and an electric motor that is driven by the power received by the power-receiving circuit are provided in a pallet, and the electric motor is driven using the power supplied wirelessly from the outside so that the pallet is able to move in a left-right direction and in an up-down direction. As a result of this, it is not necessary to lay a cable that might be used to supply power to the electric motor, and not only are the costs of the installation kept low, but the installation is easy to maintain. Moreover, because power can be supplied to the pallet wirelessly, the effect is obtained that it is possible to supply power stably without any contact malfunctions or short-circuiting or the like occurring.

DESCRIPTION OF REFERENCE SIGNS

1, 3 . . . Transfer device
2, 4 . . . Electric vehicle
30 . . . Pallet
31 . . . Power-receiving coil
32 . . . Power-receiving circuit
34 . . . Electric motor
35 . . . DC/DC converter
36 . . . Wireless communication device
37 . . . Control unit
41 . . . Storage battery
42 . . . Power-supplying circuit (Power converter)
43 . . . Power-supplying coil
44 . . . Wireless communication device
45 . . . Inverter (Power converter)
46 . . . First contactor
47 . . . Second contactor
48 . . . Motor
49 . . . Rotation (angle) detector
50 . . . Gate drive circuit
51 . . . Controller
51a . . . Motor controller
51b . . . Wireless power supply controller
51c . . . Gate signal selector
L1, L2, L3 . . . Switching leg
R1, R2, R3 . . . Vehicle traffic lane 43a . . . Coil
43b Capacitor
31a . . . Coil
31b . . . Capacitor

The invention claimed is:

1. A transfer device that transfers a vehicle, that has been loaded onto a pallet, in a left-right direction or in an up-down direction relative to the direction of forward travel of the vehicle, wherein the pallet comprises:
   a power-receiving coil that, together with a power-supplying coil of the vehicle, forms an electromagnetic coupling circuit, wherein the power-supplying coil of the vehicle is provided in the vehicle, and
   the power-receiving coil is mounted in such a position that, when the vehicle has been loaded onto the pallet, the power-receiving coil is able to face the power-supplying coil of the vehicle that is provided in the vehicle;
   a power-receiving circuit that receives power that is supplied wirelessly from the vehicle via the electromagnetic coupling circuit; and
   an electric motor that is driven by power received by the power-receiving circuit, and that causes the pallet to move in the left-right direction or in the up-down direction.

2. The transfer device according to claim 1, wherein the pallet is provided with:
   a power converting device that converts a portion of the power received by the power-receiving circuit; and
   a control unit that operates by means of the power converted by the power converting device, and controls operations of the electric motor.

3. The transfer device according to claim 2, wherein
   the pallet is provided with a command input portion that operates by means of the power converted by the power converting device, and receives inputs of transfer commands from outside of the command input portion that indicate that the vehicle is to be moved in the left-right direction or in the up-down direction, and
   the control unit controls the electric motor based on the transfer commands input into the command input portion.

4. A vehicle that is provided with a motor that generates power for movement, and a storage battery that supplies power to drive the motor, comprising:
   a power-supplying coil installed in the vehicle that is transferred, and positioned to face the power receiving coil of, the transfer device according to claim 1; and
   a power converter that converts DC power stored in the storage battery into AC power, and then supplies this to the power-supplying coil.

5. The vehicle according to claim 4, wherein there is provided a command output portion that outputs to outside of the command input portion a transfer command that indicates that the vehicle which has been loaded onto the pallet is to be transferred in the left-right direction or in the up-down direction.

6. The vehicle according to claim 4, wherein there is provided a power supply destination setting means that sets a supply destination for AC power output from the power converter either to the power-supplying coil or to the motor.

7. The vehicle according to claim 5, wherein there is provided a power supply destination setting means that sets a supply destination for AC power output from the power converter either to the power-supplying coil or to the motor.

* * * * *